(12) United States Patent
Keating (10) Patent No.: US 9,175,644 B2
(45) Date of Patent: Nov. 3, 2015

(54) ENGINE WITH EXHAUST GAS RECIRCULATION SYSTEM AND VARIABLE GEOMETRY TURBOCHARGER

(71) Applicant: GM GLOBAL TECHNOLOGY OPERATIONS LLC, Detroit, MI (US)

(72) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 13/869,323

(22) Filed: Apr. 24, 2013

(65) Prior Publication Data

US 2014/0223903 A1 Aug. 14, 2014

Related U.S. Application Data

(60) Provisional application No. 61/762,581, filed on Feb. 8, 2013.

(51) Int. Cl.
*F02B 33/44* (2006.01)
*F02D 23/00* (2006.01)
(Continued)

(52) U.S. Cl.
CPC ....... *F02M 25/0722* (2013.01); *F02M 25/0749* (2013.01); *Y02T 10/121* (2013.01)

(58) Field of Classification Search
CPC ........... F02M 25/0722; F02M 25/0749; Y02T 10/121
USPC .................................. 60/605.2, 602, 321–323
See application file for complete search history.

(56) References Cited

U.S. PATENT DOCUMENTS 4,179,892 A * 12/1979 Heydrich ..................... 60/605.2
6,230,682 B1 * 5/2001 Gustafsson et al. .......... 123/323
6,360,782 B1 * 3/2002 Yoshitoshi et al. ........... 138/115
(Continued)

FOREIGN PATENT DOCUMENTS

DE 102008049096 * 4/2010 ............. F01N 13/18
FR 696139 A * 12/1930 ............ F02B 37/007
(Continued)

OTHER PUBLICATIONS

V. A. W. Hillier, Peter Coombes, Hillier's Fundamentals of Motor Vehicle Technology, Book 1, 2004, Nelson Thornes Ltd., 5$^{th}$ ed., p. 48.*

*Primary Examiner* — Thai Ba Trieu
*Assistant Examiner* — Ngoc T Nguyen
(74) *Attorney, Agent, or Firm* — Quinn Law Group, PLLC (57) ABSTRACT

An engine assembly includes an intake assembly, an internal combustion engine defining a plurality of cylinders and configured to combust a fuel and produce exhaust gas, and an exhaust assembly in fluid communication with a first subset of the plurality of cylinders. Each of the plurality of cylinders are provided in fluid communication with the intake assembly. The exhaust assembly is provided in fluid communication with a first subset of the plurality of cylinders, and a dedicated exhaust gas recirculation system in fluid communication with both a second subset of the plurality of cylinders and with the intake assembly. The dedicated exhaust gas recirculation system is configured to route all of the exhaust gas from the second subset of the plurality of cylinders to the intake assembly. Finally, the engine assembly includes a turbocharger having a variable geometry turbine in fluid communication with the exhaust assembly.

19 Claims, 5 Drawing Sheets

(51) Int. Cl.
*F02M 25/07* (2006.01)
*F01N 1/12* (2006.01)

(56) References Cited

U.S. PATENT DOCUMENTS

| | | | |
|---|---|---|---|
| 6,694,735 B2* | 2/2004 | Sumser et al. | 60/605.2 |
| 7,252,177 B2* | 8/2007 | Minato | 60/323 |
| 2009/0158588 A1* | 6/2009 | Nording | 29/890.08 |
| 2009/0199825 A1* | 8/2009 | Piper et al. | 60/605.2 |
| 2012/0159946 A1* | 6/2012 | Sauerstein | 60/598 |
| 2014/0278011 A1* | 9/2014 | Geckler et al. | 701/108 |
| 2014/0318121 A1* | 10/2014 | Keating et al. | 60/602 |
| 2014/0331667 A1* | 11/2014 | Kindl et al. | 60/605.2 |

FOREIGN PATENT DOCUMENTS

| | | | | |
|---|---|---|---|---|
| JP | 2002213236 A | * | 7/2002 | F01N 3/24 |
| JP | 2009287434 A | * | 12/2009 | F02B 37/02 |

* cited by examiner

ENGINE WITH EXHAUST GAS RECIRCULATION SYSTEM AND VARIABLE GEOMETRY TURBOCHARGER

CROSS REFERENCE TO RELATED APPLICATIONS

This application claims the benefit of U.S. Provisional Application No. 61/762,581, filed Feb. 8, 2013, which is hereby incorporated by reference in its entirety.

STATEMENT REGARDING FEDERALLY SPONSORED RESEARCH OR DEVELOPMENT

This invention was made with government support under DOE/NETL grant number DE-EE0005654. The invention described herein may be manufactured and used by or for the U.S. Government for U.S. Government (i.e., non-commercial) purposes without the payment of royalties thereon or therefore.

TECHNICAL FIELD

The present invention relates generally to turbocharged internal combustion engines with dedicated exhaust gas recirculation.

BACKGROUND

Internal combustion engines may combust a mixture of air and fuel within one or more combustion chambers to produce a mechanical output. During the combustion, various exhaust gases are produced and expelled to the atmosphere. In some instances, a portion of the exhaust gas may be recirculated back into the engine cylinders (via an exhaust gas recirculation system). In a gasoline engine, this inert exhaust may displace an amount of combustible mixture in the cylinder resulting in increased engine efficiency. In a diesel engine, the exhaust gas may replace some of the excess oxygen in the pre-combustion mixture. In either instance, the recirculated exhaust may reduce the combustion temperature in the cylinder and/or reduce the creation of certain gaseous byproducts.

SUMMARY

An engine assembly includes an intake assembly, an internal combustion engine defining a plurality of cylinders and configured to combust a fuel and produce exhaust gas, and an exhaust assembly in fluid communication with a first subset of the plurality of cylinders. Each of the plurality of cylinders is provided in fluid communication with the intake assembly.

The exhaust assembly is provided in fluid communication with a first subset of the plurality of cylinders, and a dedicated exhaust gas recirculation system in fluid communication with both a second subset of the plurality of cylinders and with the intake assembly. The dedicated exhaust gas recirculation system is configured to route all of the exhaust gas from the second subset of the plurality of cylinders to the intake assembly.

Finally, the engine assembly includes a turbocharger that includes a compressor in fluid communication with the intake assembly, and a variable geometry turbine in fluid communication with the exhaust assembly. The compressor and variable geometry turbine are operatively connected through a shaft.

The variable geometry turbine includes a rotatable turbine wheel disposed within a housing, and a plurality of articulating veins circumferentially disposed about the rotatable turbine wheel. The articulating veins are configured to articulate between a substantially open and a substantially closed position to controllably nozzle the exhaust gas to the turbine wheel.

The exhaust assembly may further include a first exhaust manifold and a second exhaust manifold, and the first subset of the plurality of cylinders includes a first cylinder and a second cylinder. The first exhaust manifold may receive the produced exhaust gas from the first cylinder, and the second exhaust manifold may receive the produced exhaust gas from the second cylinder. In this manner the design may separate the exhaust pulses generated between the respective first and second cylinders.

In one configuration, the first exhaust manifold and the second exhaust manifold may converge at a manifold interface, wherein the manifold interface defines a first manifold flow path in fluid communication with the first exhaust manifold and defines a second manifold flow path in fluid communication with the second exhaust manifold. In this configuration, the first manifold flow path may be internally separated from the second manifold flow path by a manifold flow divider.

The variable geometry turbine may include a turbine housing defining a turbine inlet. The turbine inlet may be coupled with the manifold interface and may be in fluid communication with the manifold interface. A turbine flow divider may be disposed within the turbine inlet, and may partially define a first turbine channel and a second turbine channel. The first turbine channel may be in fluid communication with the first manifold flow path, and the second turbine channel may be in fluid communication with the second manifold flow path. In this configuration, the turbine flow divider may then abut the manifold flow divider.

In another embodiment, the plurality of cylinders may more specifically include a first cylinder, a second cylinder, a third cylinder, and a fourth cylinder. The exhaust assembly may then includes a first exhaust manifold, a second exhaust manifold, and an EGR manifold. The first exhaust manifold may receive the produced exhaust gas from the first cylinder. The second exhaust manifold may receive the produced exhaust gas from both the second cylinder and the third cylinder, and the EGR manifold may receive all of the produced exhaust gas from the fourth cylinder. Additionally, the plurality of cylinders may combust fuel sequentially in the order of the first cylinder, the third cylinder, the fourth cylinder, and the second cylinder.

The above features and advantages and other features and advantages of the present invention are readily apparent from the following detailed description of the best modes for carrying out the invention when taken in connection with the accompanying drawings.

DETAILED DESCRIPTION

Figure 1:
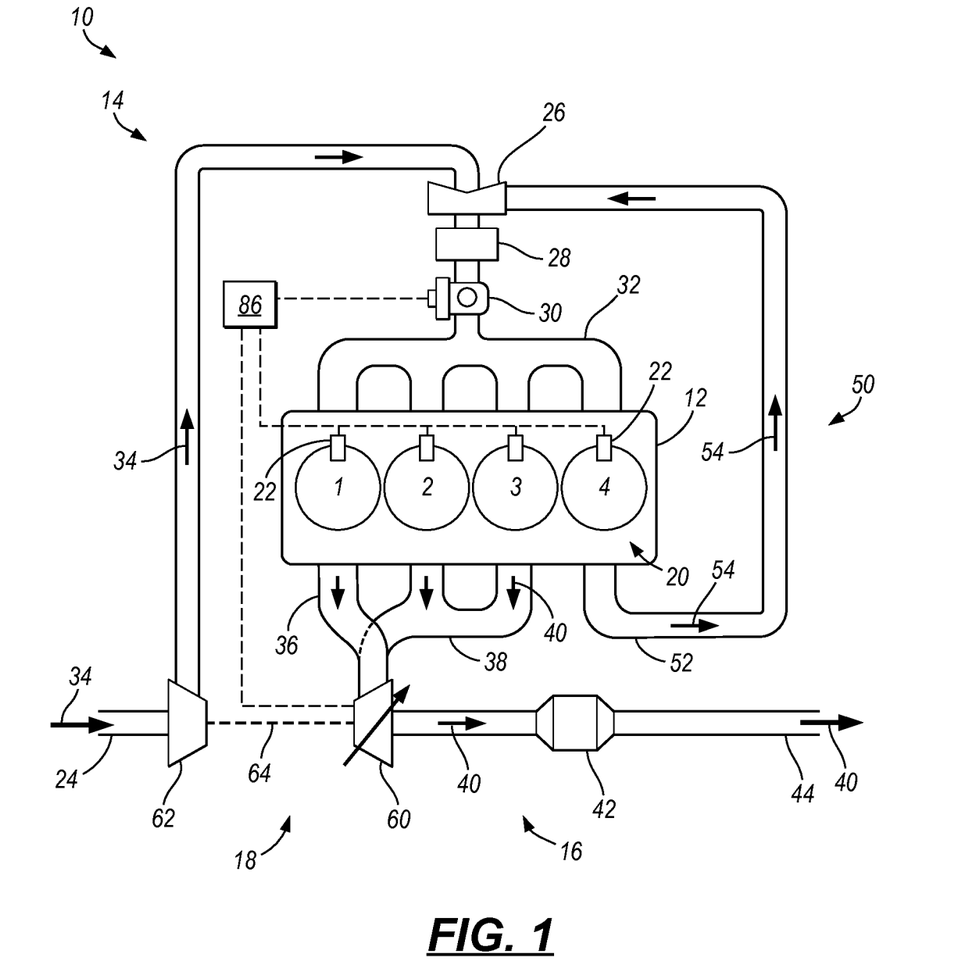
FIG. 1 is a schematic diagram of an internal combustion engine assembly with a variable geometry turbocharger and dedicated exhaust gas recirculation.

Referring to the drawings, wherein like reference numerals are used to identify like or identical components in the various views, FIG. 1 schematically illustrates an engine assembly 10 including an internal combustion engine 12, an air intake system 14, and an exhaust system 16. The air intake system 14 and the exhaust system 16 may each respectively be in fluid communication with the engine 12, and may be in mechanical communication with each other through a turbocharger 18.

The internal combustion engine 12 (i.e., engine 12) may be a spark-ignited internal combustion engine, and may define a plurality of cylinders 20 (referenced as cylinders 1-4). Each of the respective cylinders 20 may include one or more fuel injectors 22 that may selectively introduce liquid fuel (as an aerosol) into each cylinder for combustion. Each of the cylinders 20 may be in selective fluid communication with the air intake system 14 to receive fresh/oxygenated air, and several of the cylinders 20 may be in selective fluid communication with the exhaust system 16 to expel the byproducts of combustion. While the illustrated engine 12 depicts a 4-cylinder engine, the present technology is equally applicable to inline three and six cylinder engines, V-8, V-10, and V-12 configuration engines, among others.

The air intake system 14 may generally include a fresh-air inlet 24, an exhaust gas recirculation (EGR) mixer 26, a charge air cooler 28, a throttle 30, and an intake manifold 32. As may be appreciated during operation of the engine 12 fresh air 34 may be ingested by the air intake system 14 from the atmosphere (or from an associated air-cleaner assembly) via the fresh-air inlet 24. The throttle 30 may include a controllable baffle configured to selectively regulate the total flow of air through the intake system 14, and ultimately into the cylinders 20 (via the intake manifold 32).

The exhaust system 16 may include at least a first exhaust manifold 36 and a second exhaust manifold 38 that may channel flowing exhaust gasses 40 away from the engine 12. The exhaust gasses 40 may pass through an aftertreatment device 42 to catalyze and/or remove certain byproducts prior to exiting the exhaust system 16 via a tailpipe 44.

As mentioned above, the air intake system 14 and the exhaust system 16 may be in mechanical communication through a turbocharger 18. The turbocharger 18 may include a variable geometry turbine 60 ("VGT 60" or "turbine 60") in fluid communication with the exhaust system 16 and a compressor 62 in fluid communication with the intake system 14. The turbine 60 and the compressor 62 may be mechanically coupled via a rotatable shaft 64. The turbocharger 18 may utilize the energy of exhaust gasses 40 flowing from the engine 12 to spin the turbine 60 and compressor 62. The rotation of the compressor 62 may then draw fresh air 34 in from the inlet 24 and compress it into the remainder of the intake system 14.

The engine assembly 10 may further include a dedicated EGR system 50 that may directly route (e.g., via an EGR manifold 52) the exhaust gas 54 from one or more cylinders of the engine 12 back into the intake system 14. This recirculated exhaust gas 54 may mix with the fresh air 34 at the EGR mixer 26, and may correspondingly dilute the oxygen content of the mixture. The use of EGR is known to increase efficiency in spark ignition engines. EGR is also known to reduce the combustion temperature and NOx production from the engine 12. Using a separate EGR manifold 52 to route the entire exhaust of one or more cylinders back to the intake assembly 14 is referred to herein as "dedicated EGR."

As illustrated in FIG. 1, one of the cylinders 20 (i.e., cylinder 4) is a dedicated EGR cylinder that may supply 100% of its exhaust gas 54 back to the intake assembly 14. The exhaust gas 40 of the remaining three cylinders 20 (i.e., cylinders 1-3) is expelled from the engine 12 via the exhaust assembly 16.

Figure 2A:
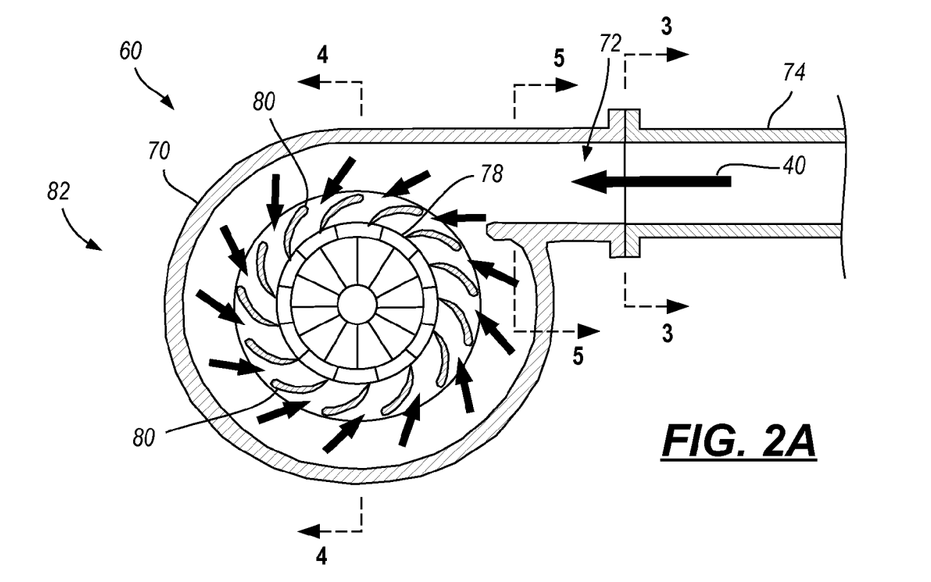
FIG. 2A is a schematic cross-sectional view of a variable geometry turbocharger turbine during a period of high exhaust flow.
Figure 2B:
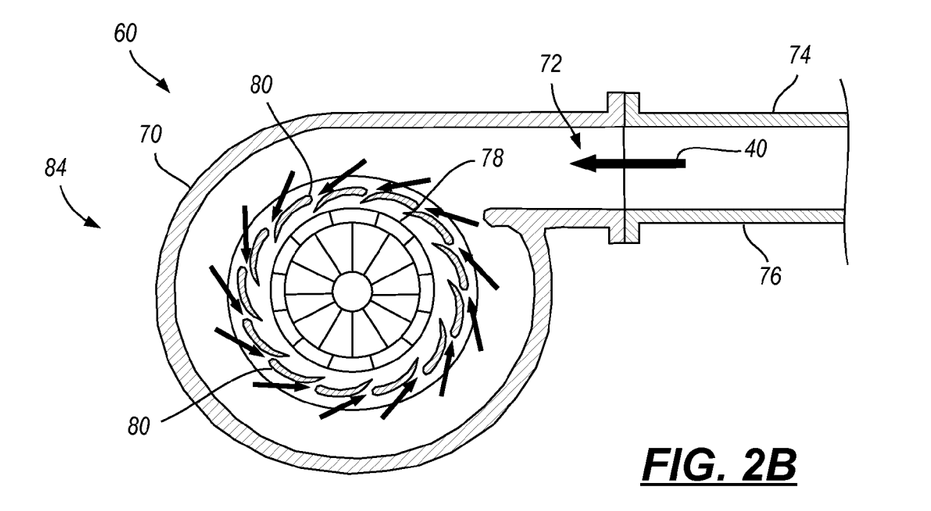
FIG. 2B is a schematic cross-sectional view of a variable geometry turbocharger turbine during a period of low exhaust flow.

FIGS. 2A and 2B illustrate two states of the variable geometry turbine 60. In each case, the turbine 60 includes a housing 70 that defines a turbine inlet 72. The turbine inlet 72 is configured to couple the turbine housing 70 with the first and second exhaust manifolds 36, 38 via a common manifold interface 74. In one configuration, the common manifold interface 74 may be a single tube that may be in fluid communication with each of the first exhaust manifold 36 and the second exhaust manifold 38. A rotatable turbine wheel 78 is disposed within the housing 70, and is mechanically coupled with the compressor 62. A plurality of individually articulating veins 80 are disposed about the rotatable turbine wheel 78, and are configured to controllably nozzle the flow of exhaust gas 40 to the turbine wheel 78, where the exhaust gas 40 may then exit the housing in a direction generally aligned with the axis of rotation of the wheel 78.

FIG. 2A illustrates the variable geometry turbine 60 in a high-flow exhaust state 82, and FIG. 2B illustrates the variable geometry turbine 60 in a low-flow exhaust state 84. In the high-flow state 82, each of the plurality of veins 80 are articulated to an "open" position, whereby the exhaust gas 40 may be more freely allowed to contact the turbine wheel 78. In the low-flow state 84, each of the plurality of veins 80 are articulated to a "substantially closed" position, whereby the exhaust gas 40 is nozzled toward the turbine wheel 78. By nozzling the exhaust gas 40 toward the turbine wheel 78, the variable geometry turbine 60 may attempt to maintain a minimum turbine wheel speed, even despite the low flow rate. Referring to FIG. 1, a controller 86 may be in electronic communication with the throttle 30, fuel injectors 22, and/or various mass/flow sensors within the intake assembly 14 or exhaust assembly 16 to determine the most efficient angular state of the various veins 80. Once this is determined, the controller 86 may continuously command the veins 80 to rotate to the proper angle. In this manner, the variable geometry turbine 60 may provide an improved transient response at substantially lower flow rates (when compared with a standard turbocharger).

Referring again to FIG. 1, in a typical 4-cylinder engine, the firing order may sequentially be: cylinder 1; cylinder 3; cylinder 4; cylinder 2. As may be appreciated, the engine 12 may then expel gas from the cylinders in the same sequential order. Therefore, the exhaust flow more closely resembles a series of pulses than a continuous flow.

It has been found that engine efficiency is maximized when exhaust pulses are separated from each other. In addition to reducing interference between the pulses, the separation may reduce the occurrence of knocking and/or abnormal combustion. In an effort to achieve sufficient pulse separation, the exhaust flow may be divided into different flows, which may be separately introduced to the turbocharger 18. In an ideal 4-cylinder engine with the firing order previously noted, this separation would pair cylinder 1 with cylinder 4, and cylinder 3 with cylinder 2. In the present configuration, however, cylinder 4 is a dedicated EGR cylinder, with 100% of its exhaust returning to the intake assembly 14. Therefore, cylinders 2 & 3 may remain paired (via the second exhaust manifold 38), while cylinder 1 may be isolated (via the first exhaust manifold 36), and cylinder 4 may be independently recirculated.

Figure 3:
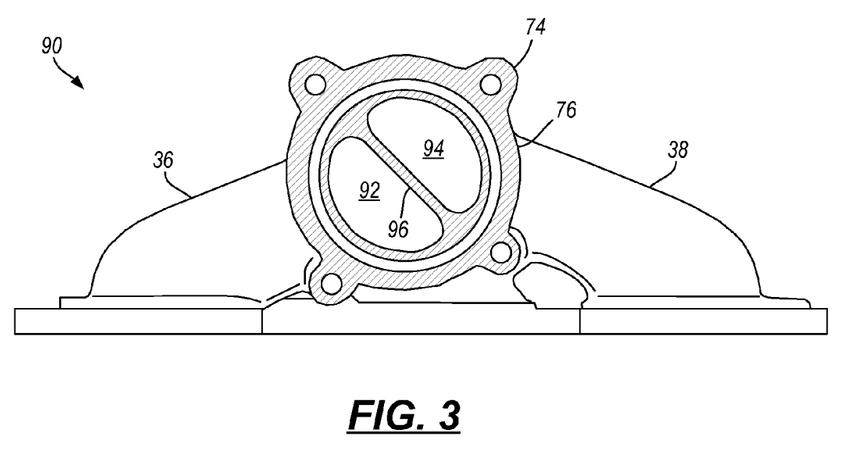
FIG. 3 is a schematic cross-sectional view, taken along line 3-3 of FIG. 2A, showing a manifold interface for coupling a first and second exhaust manifold to a turbocharger turbine housing.

FIG. 3 illustrates a cross-sectional view 90 of an embodiment of the manifold interface 74 shown in FIG. 2A, and taken along line 3-3. As shown, the first exhaust manifold 36 and the second exhaust manifold 38 may converge to a single physical tube 76, yet may still remain independent. Said another way, the manifold interface 74 may define a first manifold flow path 92 in fluid communication with only the first exhaust manifold 36, and may define a second manifold flow path 94 in fluid communication with only the second exhaust manifold 38. A manifold flow divider 96 may separate the first manifold flow path 92 from the second manifold flow path 94. In this manner, assembly may only require the attachment of one part to the housing 70 of the turbine 60, yet the exhaust pulses may be separated to a greater degree than with one single flow-path. In an alternative embodiment, the manifold interface 74 may be integrally formed with the housing 70.

To maximize efficiency, it may be desirable to maintain the exhaust flow separation up to the introduction of the exhaust flow to the turbine wheel 78 (ideally where each flow would act on a physically different portion of the wheel 78. Unfortunately, however, the plurality of articulating veins 80 in the variable geometry turbocharger may prevent the flows from being isolated to that extent.

Figure 4:
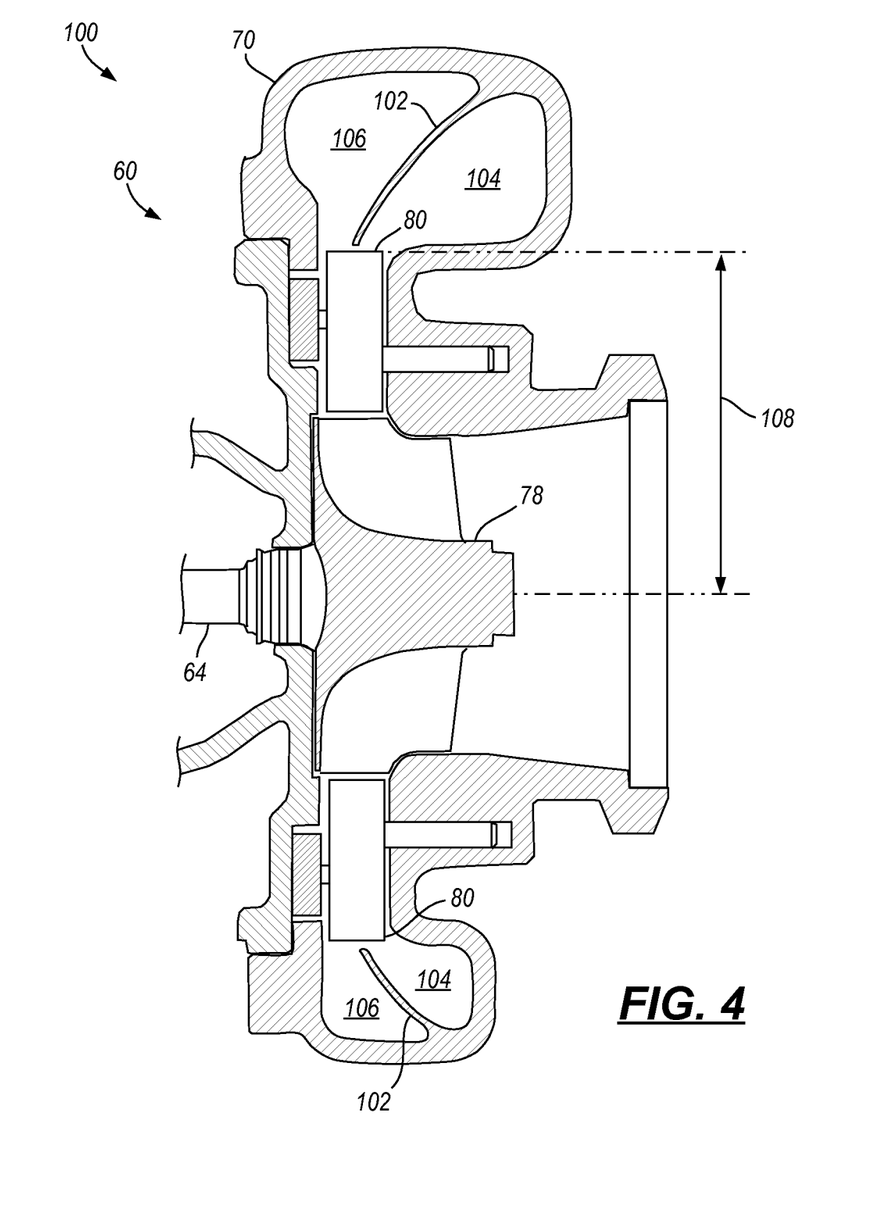
FIG. 4 is a schematic cross-sectional view, taken along line 4-4 of FIG. 2A, illustrating a first embodiment of a variable geometry turbocharger turbine.

FIG. 4 schematically illustrates a cross-sectional view 100 of an embodiment of the variable geometry turbine 60 shown in FIG. 2A, and taken along line 4-4. As shown, the turbine housing 70 may include a housing flow divider 102 that may partially separate a first turbine channel 104 from a second turbine channel 106. The turbine flow divider 102 may surround, or substantially surround the turbine wheel 78 and plurality of articulating veins 80, and may further extend through the turbine inlet 72 and mate with/abut the manifold flow divider 96. In this manner, the first turbine channel 104 may be in fluid communication with the first manifold flow path 92, and the second turbine channel 106 may be in fluid communication with the second manifold flow path 94.

Each of the first and second turbine channels 104, 106 may be open to the articulating veins 80 such that exhaust gas may pass from the respective turbine channels 104, 106 across the respective veins 80 and to the turbine wheel 78. The turbine flow divider 102 may extend from the turbine housing 70 to a point that is at or immediately proximate to the furthest outward radial distance 108 the articulating veins 80 can extend (also accounting for thermal expansion). In this manner, when the veins 80 are rotated to their fully opened state, they closely approach the divider 102, though do not make contact.

Figure 5:
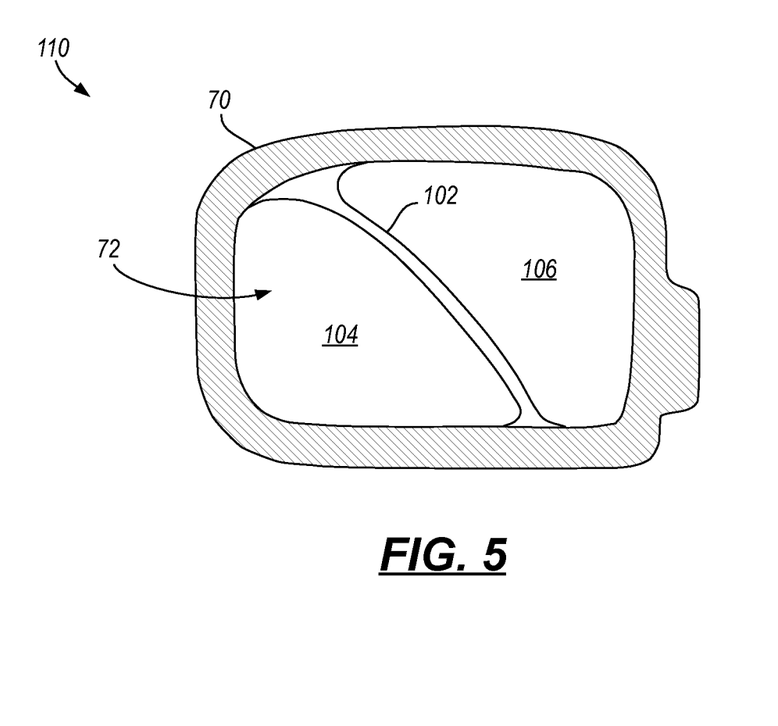
FIG. 5 is a schematic cross-sectional view, such as taken along line 5-5 of FIG. 2A, illustrating a second embodiment of a variable geometry turbocharger turbine.

FIG. 5 schematically illustrates a cross-sectional view 110 of another embodiment of a variable geometry turbine 60. This cross-sectional view 110 may be taken from a turbine 60 similar to that shown in FIG. 2A, and taken along line 5-5. As shown, the turbine housing 70 may include a turbine flow divider 102 that may partially separate a first turbine channel 104 from a second turbine channel 106 only within the turbine inlet 72. Said another way, the flow divider 102 may terminate prior to entering the volute portion of the turbine housing 70, wherein the two exhaust flows may join to present a uniform flow to the turbine wheel. In one configuration, the flow divider 102 may twist (e.g., in a screw or helicoid shape) or include any other such geometry that may aid in promoting a uniform distribution of exhaust flow to the turbine wheel.

The presently described engine assembly 10 employs the dedicated EGR system 50, which has been shown to reduce the average exhaust gas temperature by promoting more efficient combustion. In doing so, the dedicated EGR system 50 may enable the use of a variable geometry turbine 60 on a spark-ignited combustion engine without the need to over-design the articulating veins 80 to withstand typical elevated spark-ignited engine combustion temperatures (which are generally hotter than any current uses of a VGT). Additionally, employing the present pulse separation techniques within the VGT housing may provide an additional efficiency increase beyond mere application of the VGT. The combination of these techniques may be used to increase the efficiency of the spark-ignited gasoline engine assembly 10 without adding a substantial amount of weight or cost to the vehicle.

While the best modes for carrying out the invention have been described in detail, those familiar with the art to which this invention relates will recognize various alternative designs and embodiments for practicing the invention within the scope of the appended claims. Any directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. An engine assembly comprising:
    an intake assembly;
    a spark-ignited internal combustion engine defining a plurality of cylinders and configured to combust a fuel;
        wherein the plurality of cylinders includes a first cylinder, a second cylinder, a third cylinder, and a fourth cylinder;
        wherein each of the plurality of cylinders is in fluid communication with the intake assembly;
        wherein combustion of the fuel occurs within the plurality of cylinders and produces an exhaust gas;
    an exhaust assembly in fluid communication with a first subset of the plurality of cylinders, the exhaust assembly including a first exhaust manifold, a second exhaust manifold, and an EGR manifold;
        wherein the first exhaust manifold and the second exhaust manifold converge at a manifold interface, wherein the manifold interface defines a first manifold flow path in fluid communication with the first exhaust manifold and defines a second manifold flow path in fluid communication with the second exhaust manifold, and wherein the first manifold flow path is separated from the second manifold flow path by a manifold flow divider;
        wherein the first exhaust manifold receives the produced exhaust gas from the first cylinder;
        wherein the second exhaust manifold receives the produced exhaust gas from both the second cylinder and the third cylinder;
        wherein the EGR manifold is a dedicated EGR manifold that receives all of the produced exhaust gas from the fourth cylinder and is configured to route all of the exhaust gas from the fourth cylinder to the intake assembly; and
    a turbocharger including:
        a compressor in fluid communication with the intake assembly;

a variable geometry turbine in fluid communication with the first exhaust manifold and with the second exhaust manifold; and wherein the compressor and variable geometry turbine are operatively connected through a shaft.

2. The engine assembly of claim 1, wherein the variable geometry turbine includes a turbine housing defining a turbine inlet; and wherein the turbine inlet is coupled with the manifold interface and is in fluid communication with the manifold interface.

3. The engine assembly of claim 2, further comprising a turbine flow divider disposed within the turbine inlet;

wherein the turbine flow divider partially defines a first turbine channel and a second turbine channel;

wherein the first turbine channel is in fluid communication with the first manifold flow path, the second turbine channel is in fluid communication with the second manifold flow path; and wherein the turbine flow divider abuts the manifold flow divider.

4. The engine assembly of claim 3, wherein the variable geometry turbine includes a rotatable turbine wheel disposed within the housing; and a plurality of articulating veins circumferentially disposed about the rotatable turbine wheel, and configured to controllably nozzle the exhaust gas to the turbine wheel.

5. The engine assembly of claim 4, wherein the plurality of articulating veins are transitionable between a first state and a second state, wherein the second state provides a greater resistance to exhaust flow than the first state;

wherein each of the plurality of articulating veins respectively extend to a first radial position apart from the center of the rotatable turbine wheel when in the first state; and wherein the turbine flow divider extends to a position proximate the first radial position for each of the plurality of articulating veins.

6. The engine assembly of claim 3, wherein the turbine flow divider only extends within the turbine inlet.

7. The engine assembly of claim 1, wherein the plurality of cylinders combust fuel sequentially in the order of the first cylinder, the third cylinder, the fourth cylinder, and the second cylinder.

8. The engine assembly of claim 1, wherein the variable geometry turbine includes: a rotatable turbine wheel; and a plurality of articulating veins circumferentially disposed about the rotatable turbine wheel, and configured to controllably nozzle the exhaust gas to the turbine wheel.

9. An engine assembly comprising:

an intake assembly;

a spark-ignited internal combustion engine defining a plurality of cylinders and configured to combust a fuel;

wherein the plurality of cylinders includes a first cylinder, a second cylinder, a third cylinder, and a fourth cylinder, wherein the plurality of cylinders combust fuel sequentially in the order of the first cylinder, the third cylinder, the fourth cylinder, and the second cylinder;

wherein each of the plurality of cylinders is in fluid communication with the intake assembly;

wherein combustion of the fuel occurs within the plurality of cylinders and produces an exhaust gas;

an exhaust assembly in fluid communication with a first subset of the plurality of cylinders, the exhaust assembly including a first exhaust manifold, a second exhaust manifold, and an EGR manifold;

wherein the first exhaust manifold receives the produced exhaust gas from the first cylinder;

wherein the second exhaust manifold receives the produced exhaust gas from both the second cylinder and the third cylinder;

wherein the EGR manifold is a dedicated EGR manifold that receives all of the produced exhaust gas from the fourth cylinder and is configured to route all of the exhaust gas from the fourth cylinder to the intake assembly; and a turbocharger including:

a compressor in fluid communication with the intake assembly;

a variable geometry turbine in fluid communication with the first exhaust manifold and with the second exhaust manifold; and wherein the compressor and variable geometry turbine are operatively connected through a shaft.

10. The engine assembly of claim 9, wherein the first exhaust manifold and the second exhaust manifold converge at a manifold interface;

wherein the manifold interface defines a first manifold flow path in fluid communication with the first exhaust manifold and defines a second manifold flow path in fluid communication with the second exhaust manifold; and wherein the first manifold flow path is separated from the second manifold flow path by a manifold flow divider.

11. The engine assembly of claim 10, wherein the variable geometry turbine includes a turbine housing defining a turbine inlet; and wherein the turbine inlet is coupled with the manifold interface and is in fluid communication with the manifold interface.

12. The engine assembly of claim 11, further comprising a turbine flow divider disposed within the turbine inlet;

wherein the turbine flow divider partially defines a first turbine channel and a second turbine channel;

wherein the first turbine channel is in fluid communication with the first manifold flow path, the second turbine channel is in fluid communication with the second manifold flow path; and wherein the turbine flow divider abuts the manifold flow divider.

13. The engine assembly of claim 12, wherein the variable geometry turbine includes a rotatable turbine wheel disposed within the housing; and a plurality of articulating veins circumferentially disposed about the rotatable turbine wheel, and configured to controllably nozzle the exhaust gas to the turbine wheel.

14. The engine assembly of claim 13, wherein the plurality of articulating veins are transitionable between a first state and a second state, wherein the second state provides a greater resistance to exhaust flow than the first state;

wherein each of the plurality of articulating veins respectively extend to a first radial position apart from the center of the rotatable turbine wheel when in the first state; and wherein the turbine flow divider extends to a position proximate the first radial position for each of the plurality of articulating veins.

15. The engine assembly of claim 12, wherein the turbine flow divider only extends within the turbine inlet.

16. An engine assembly comprising:

an intake assembly;

a spark-ignited internal combustion engine defining a plurality of cylinders and configured to combust a fuel;

wherein the plurality of cylinders includes a first cylinder, a second cylinder, a third cylinder, and a fourth cylinder;

wherein each of the plurality of cylinders is in fluid communication with the intake assembly;

wherein combustion of the fuel occurs within the plurality of cylinders and produces an exhaust gas;

an exhaust assembly in fluid communication with a first subset of the plurality of cylinders, the exhaust assembly including a first exhaust manifold, a second exhaust manifold, and an EGR manifold;

wherein the first exhaust manifold receives the produced exhaust gas from the first cylinder;

wherein the second exhaust manifold receives the produced exhaust gas from both the second cylinder and the third cylinder;

wherein the EGR manifold is a dedicated EGR manifold that receives all of the produced exhaust gas from the fourth cylinder and is configured to route all of the exhaust gas from the fourth cylinder to the intake assembly; and a turbocharger including:
- a compressor in fluid communication with the intake assembly;
- a variable geometry turbine in fluid communication with the first exhaust manifold and with the second exhaust manifold, the variable geometry turbine including a rotatable turbine wheel and a plurality of articulating veins circumferentially disposed about the rotatable turbine wheel, wherein the plurality of articulating veins are configured to controllably nozzle the exhaust gas to the rotatable turbine wheel; and
- wherein the compressor and variable geometry turbine are operatively connected through a shaft.

17. The engine assembly of claim 16, wherein the first exhaust manifold and the second exhaust manifold converge at a manifold interface;

wherein the manifold interface defines a first manifold flow path in fluid communication with the first exhaust manifold and defines a second manifold flow path in fluid communication with the second exhaust manifold; and wherein the first manifold flow path is separated from the second manifold flow path by a manifold flow divider.

18. The engine assembly of claim 17, wherein the variable geometry turbine includes a turbine housing defining a turbine inlet; and wherein the turbine inlet is coupled with the manifold interface and is in fluid communication with the manifold interface.

19. The engine assembly of claim 18, further comprising a turbine flow divider disposed within the turbine inlet;

wherein the turbine flow divider partially defines a first turbine channel and a second turbine channel;

wherein the first turbine channel is in fluid communication with the first manifold flow path, the second turbine channel is in fluid communication with the second manifold flow path; and wherein the turbine flow divider abuts the manifold flow divider.

* * * * *